(12) United States Patent
Curren

(10) Patent No.: US 9,102,396 B2
(45) Date of Patent: Aug. 11, 2015

(54) MECHANICAL JOINT

(75) Inventor: Matthew D Curren, Derby (CA)

(73) Assignee: ROLLS-ROYCE PLC, London (GB)

( * ) Notice: Subject to any disclaimer, the term of this patent is extended or adjusted under 35 U.S.C. 154(b) by 753 days.

(21) Appl. No.: 13/384,865

(22) PCT Filed: Jul. 2, 2010

(86) PCT No.: PCT/EP2010/059446
§ 371 (c)(1),
(2), (4) Date: Feb. 2, 2012

(87) PCT Pub. No.: WO2011/009702
PCT Pub. Date: Jan. 27, 2011

(65) Prior Publication Data
US 2012/0189453 A1    Jul. 26, 2012

(30) Foreign Application Priority Data

Jul. 20, 2009    (GB) .................................. 0912484.3

(51) Int. Cl.
*B64C 11/04*    (2006.01)
*F16B 21/04*    (2006.01)

(52) U.S. Cl.
CPC ................. *B64C 11/04* (2013.01); *F16B 21/04* (2013.01); *Y10T 403/7005* (2015.01)

(58) Field of Classification Search
CPC ...... B64C 11/04; B64C 11/06; B64C 11/065; B64C 11/08; B64C 11/10; B64C 11/12; F16B 21/02; F16B 21/04
USPC .......... 403/348; 416/204 R, 204 A, 205, 207, 416/209, 220 R
See application file for complete search history.

(56) References Cited

U.S. PATENT DOCUMENTS

| 2,587,838 A | 3/1952 | Green |
| 4,606,671 A | 8/1986 | Rasmussen |

(Continued)

FOREIGN PATENT DOCUMENTS

| DE | 276 394 C | 7/1914 |
| EP | 0 233 813 A1 | 8/1987 |
| EP | 0322344 A2 * | 6/1989 |
| EP | 0 745 757 A1 | 12/1996 |
| GB | 485 978 A | 5/1938 |

OTHER PUBLICATIONS

British Search Report in British Patent Application No. 0912484.3; dated Nov. 27, 2009.

(Continued)

*Primary Examiner* — Edward Look
*Assistant Examiner* — Christopher R Legendre
(74) *Attorney, Agent, or Firm* — Oliff PLC

(57) ABSTRACT

A mechanical joint for joining two components, the joint having a male part on one component and a corresponding female part on the other component. The male and female parts have respective castellations which intercalate on insertion of the male part into the female part along a direction of insertion. Respective abutment surfaces are formed on the projections of the castellations. The castellations are configured such that, after the insertion of the male part into the female part, the male and female parts can be rotated relative to each other around the direction of insertion to bring: (i) the abutment surfaces into facing alignment and thereby prevent the parts from being pulled apart, and (ii) the indentations of the castellations into facing alignment. The joint has one or more locking members which are insertable into the facing indentations to prevent further relative rotation of the male and female parts.

15 Claims, 8 Drawing Sheets

(56) References Cited

U.S. PATENT DOCUMENTS

| | | | |
|---|---|---|---|
| 5,738,052 A | 4/1998 | Meurer et al. | |
| 2009/0184086 A1* | 7/2009 | Fraser et al. | 215/331 |
| 2009/0184518 A1* | 7/2009 | Nakamura et al. | 285/401 |
| 2010/0010455 A1* | 1/2010 | Elahi et al. | 604/208 |
| 2012/0189453 A1* | 7/2012 | Curren | 416/220 R |

OTHER PUBLICATIONS

International Search Report in International Application No. PCT/EP2010/059446; dated Oct. 20, 2010.

Written Opinion of the International Searching Authority in International Application No. PCT/EP2010/059446; dated Oct. 20, 2010.

* cited by examiner (a)

(b)

MECHANICAL JOINT

The present invention relates to mechanical joints for joining two components together, and in particular, but not exclusively for joining a rotor blade to an engine.

In certain applications a high shaft end-load needs to be carried by a joint, yet at the same time relatively quick connecting and disconnecting of the joint needs to be supported. Additionally, in certain applications the joint may have limited accessibility.

For example, aero engine rotor blades, such as propeller blades, experience high centrifugal loads, and in general need to be removable, but may have a connection to the engine which is relatively inaccessible.

According to a first aspect of the invention, there is provided a mechanical joint for joining two components, the joint having a male part on one component and a corresponding female part on the other component, the male and female parts having respective castellations which intercalate on insertion of the male part into the female part along a direction of insertion, and respective abutment surfaces which are formed on the projections of the castellations, the castellations being configured such that, after the insertion of the male part into the female part, the male and female parts can be rotated relative to each other around the direction of insertion to bring: (i) the abutment surfaces into facing alignment and thereby prevent the parts from being pulled apart, and (ii) the indentations of the castellations into facing alignment, the joint further having one or more locking members which are removably insertable into the aligned indentations to prevent further relative rotation of the male and female parts.

The locking members can prevent the abutment surfaces of the male and female parts from rotating out of alignment, and thus prevent the two parts from pulling accidentally apart. However, advantageously, the locking members are removably insertable into the aligned indentations, which allows the two components to be disconnected by removing the locking members when desired. When the joint is loaded, the castellations distribute the load around the joint. By appropriate configuration of the castellations, overly high stress concentrations can be avoided.

The mechanical joint may have any one or any combination of the following optional features.

Typically, the respective abutment surfaces are matching tapered surfaces. Using tapered surfaces can ensure that stress is distributed evenly across the surfaces, and help to limit the build up of local stress distributions that might otherwise damage the joint or lead to joint failure.

The or each locking member may be configured to substantially fully occupy the space formed by the respective aligned indentations. This can help to reduce stresses on the locking member. For example, the locking member may be block-shaped.

The one or more locking members may be insertable into the indentations along a direction which is parallel to the direction of insertion. Alternatively, the one or more locking members may be insertable into the indentations along a radial direction of the joint.

The respective castellations may be configured such that the male part can be inserted into the female part along the direction of insertion for only one rotational position of the male part relative to the female part. This can ensure appropriate alignment of the male and female parts.

Preferably, the joint further has means for chocking the abutment surfaces together. Conveniently, the locking members may be urgeable against either or both of the male and female parts to chock the surfaces together. Chocking the abutment surfaces can help to remove play in the joint, particularly before the joint is loaded.

The one or more locking members may be biased to insert themselves into the indentations of the castellations when the indentations are in facing alignment. This allows the locking members to automatically insert into the indentations after the rotation of the male and female parts. Advantageously, the locking members can then also be inserted without direct access to the joint. The bias may be provided by one or more spring members.

The joint may further have an encircling member which is rotatable about the joint and is coupled to the locking members such that rotation of the encircling member causes the locking members to be inserted into the aligned indentations. Thus an operator can rotate the encircling member to insert or remove the locking members, even if the locking members themselves are relatively inaccessible.

For example the joint may have an encircling outer casing, e.g. in the form of a barrel, the outer casing being rotatable about the joint and having a thread on its inner wall. The one or more locking members may be disposed on a ring that is located inside the barrel, the ring having a thread which engages with the thread on the inner wall of the barrel. By rotating the barrel, the ring can then be made to move inside the barrel along the insertion direction, inserting the locking members into the aligned indentations. Rotation of the outer casing in the opposite direction can remove the locking members from the indentations.

Alternatively, the encircling member may be a unison ring. The unison ring may have, e.g. a camming arrangement for moving the locking members in the radial direction slots and thereby into the aligned indentations. For example, the unison ring may have one or more angled slots which engage with respective projections from the locking members. Rotation of the unison ring thus urges side walls of the slots against the projections to move the locking members in the radial direction, the side walls acting as cam surfaces.

The or each locking member may have a respective screw for urging that locking member into the respective aligned indentations.

Typically, each castellation has at least four projections. However, having at least six or eight projections on each castellation can help to reduce localised peak stresses relative to castellations with only four projections. Larger joints may have castellations with higher numbers of projections. However, preferably the number of projections is low enough to ensure that the width of each projection does not become too small relative to the peak load that it must carry. For example, each castellation may have no more than 16 or 32 projections. Particularly for aerospace applications, such as joining a propeller blade to an aeroengine, each castellation may have six or eight projections.

One of the components may be a rotor blade (such as a propeller blade) and the other component may be part of a transmission providing power to turn the rotor blade (i.e. typically providing power to rotate the rotor blade about an engine axis).

Indeed, a further aspect of the invention provides an aero engine (such as a gas turbine engine) having a row of rotor blades (such as propeller blades), each blade being attached to the engine with a mechanical joint according to any one of the previous claims. The mechanical joint may have any one or any combination of the optional features of the previous aspect.

A third aspect of the present invention provides a component having the male or female part of the mechanical joint of the first aspect (the component optionally including any one or any combination of the optional features of the first aspect as they pertain to the component).

Embodiments of the invention will now be described by way of example with reference to the accompanying drawings in which.

Figure 3:
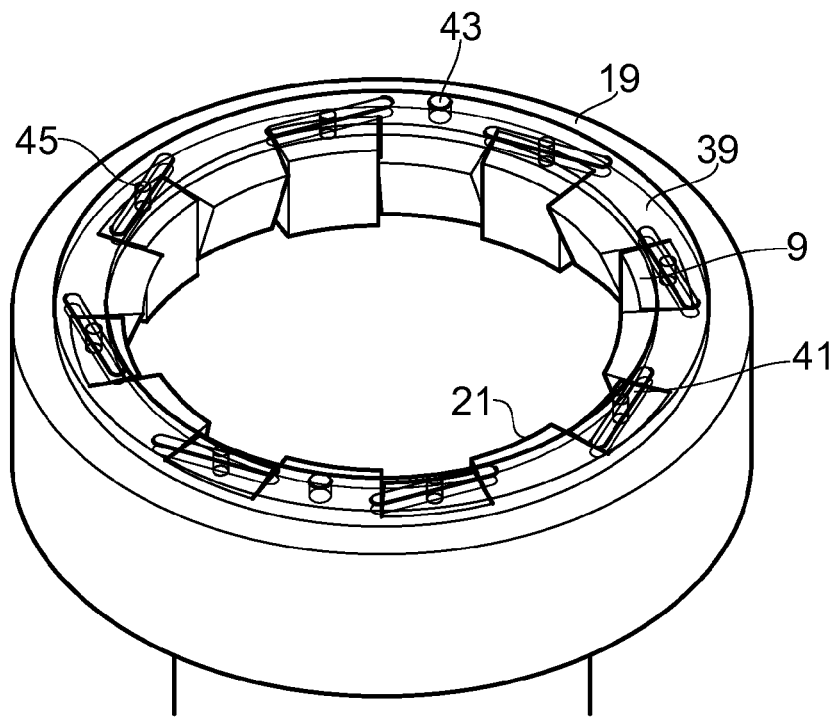
Figure 3:
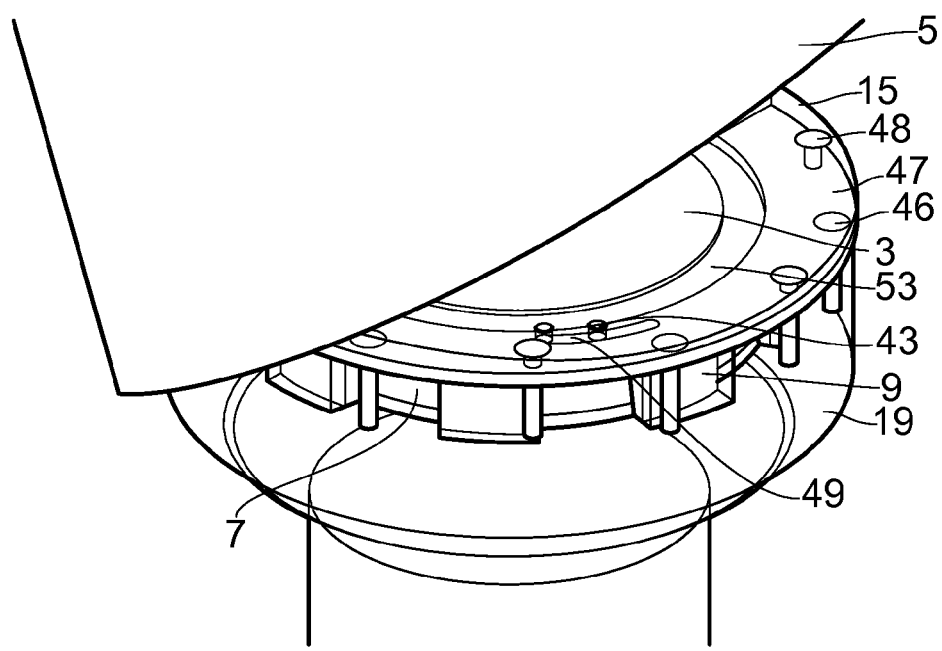
Figure 4:
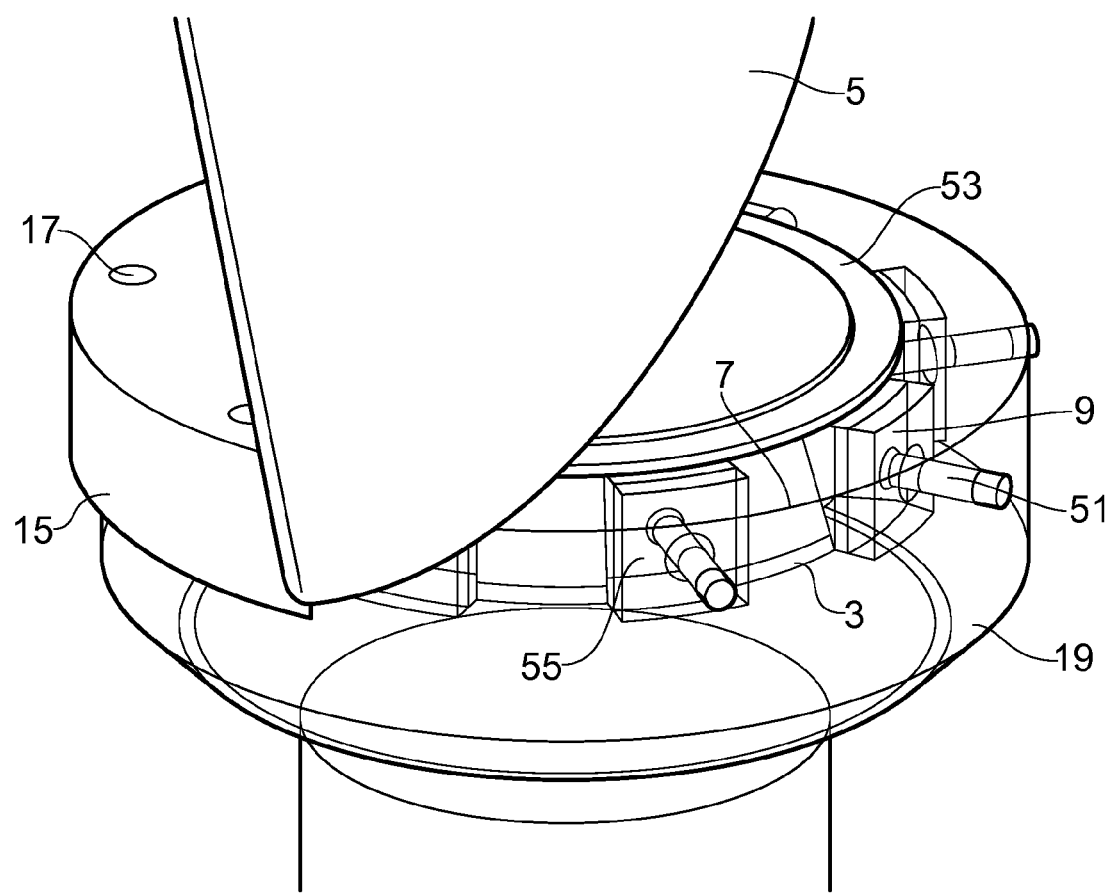

FIG. 3 shows schematically (a) the female part in a third embodiment of the invention, and (b) the mechanical joint in the third embodiment of the invention, in which the component having the female part is drawn as a transparent object; and FIG. 4 shows schematically a mechanical joint according to a fourth embodiment of the invention, in which locking blocks and the component having the female part are drawn as transparent objects.

FIGS. 5(a)-(d) shows the process of bringing the male and female parts together in the mechanical joint according to the first exemplary embodiment, in which the movement of the male part and female part are illustrated at different stages in the locking of the male and female part together. In FIGS. 5(a)-(d), the propeller blade 5 and the cover plate 15 are omitted only for illustrative purposes.

Figure 1:
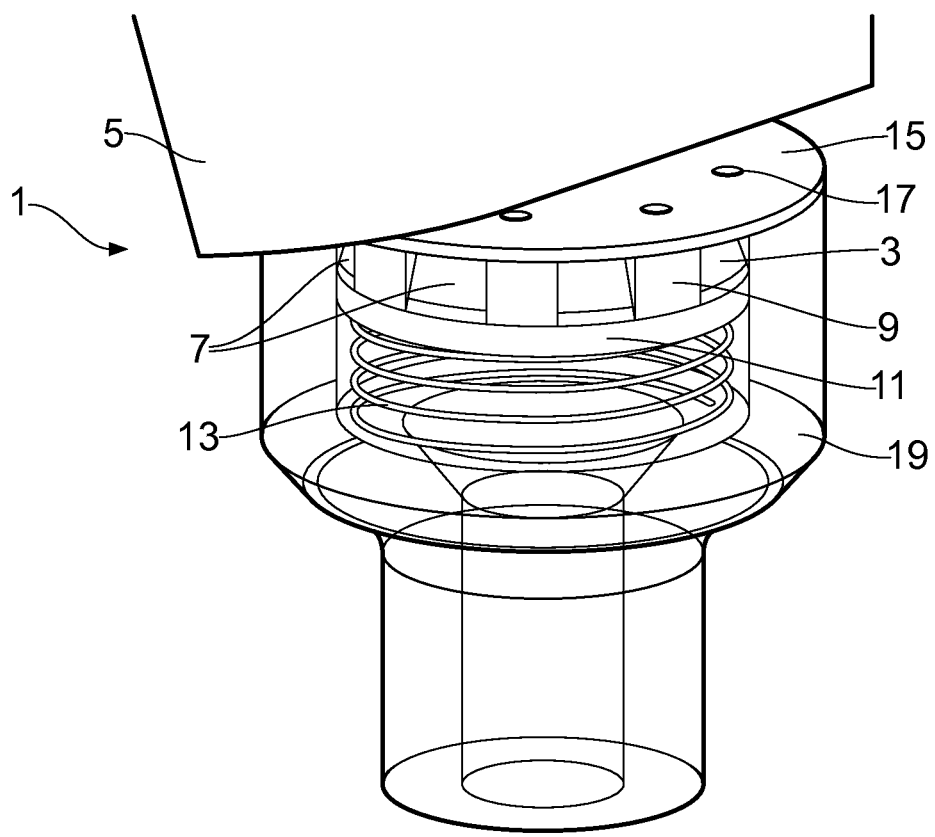
FIG. 1 shows schematically a mechanical joint according to a first embodiment of the invention, in which the component having the female part is drawn as a transparent object.

FIG. 1 shows schematically a mechanical joint 1 having a male part 3 and a female part 19 according to a first embodiment of the invention, the joint connecting a propeller blade 5 to an aero engine (not shown). In order to aid understanding, the female part of the joint is drawn as a transparent object. The propeller blade has the male part 3 at its inner end. The male part is castellated, the eight circumferentially spaced projections 7 of the castellation having radially outward facing surfaces of which form abutment surfaces for abutting with respective abutment surfaces of the projections of a correspondingly castellated female part. The abutment surfaces of the male part are tapered such that the abutment surfaces are inclined with respect to the axis of the propeller blade and the joint (which is also the direction of insertion of the male part into the female part). The abutment surfaces of the female part are also tapered with an inclination which matches that of the male part.

Locking blocks 9 are located inside the joint. The locking blocks are positioned on a ring 11 which is in turn supported on a spring 13, such that when the spring extends and contracts, the ring and locking blocks move axially with respect to the male part.

Figure 5A:
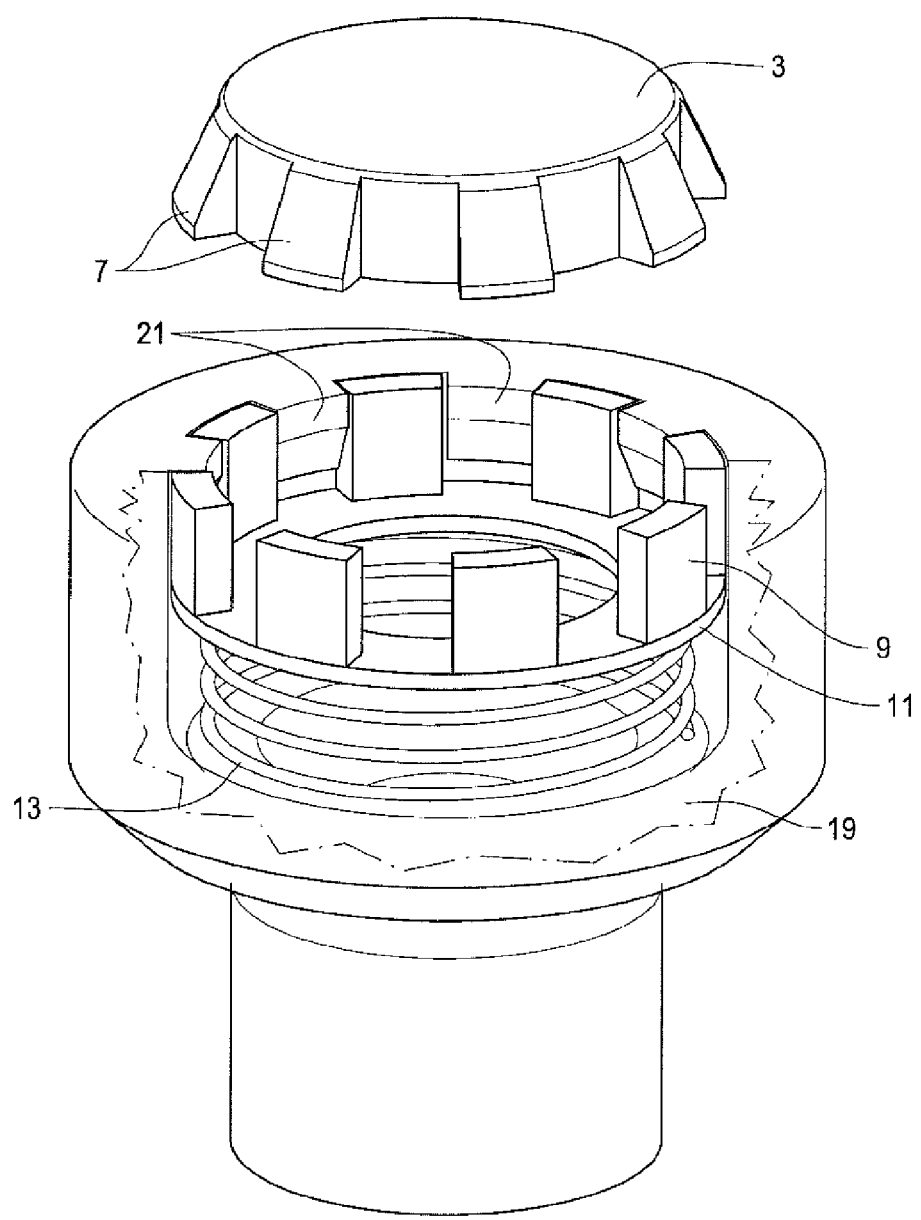
Figure 5B:
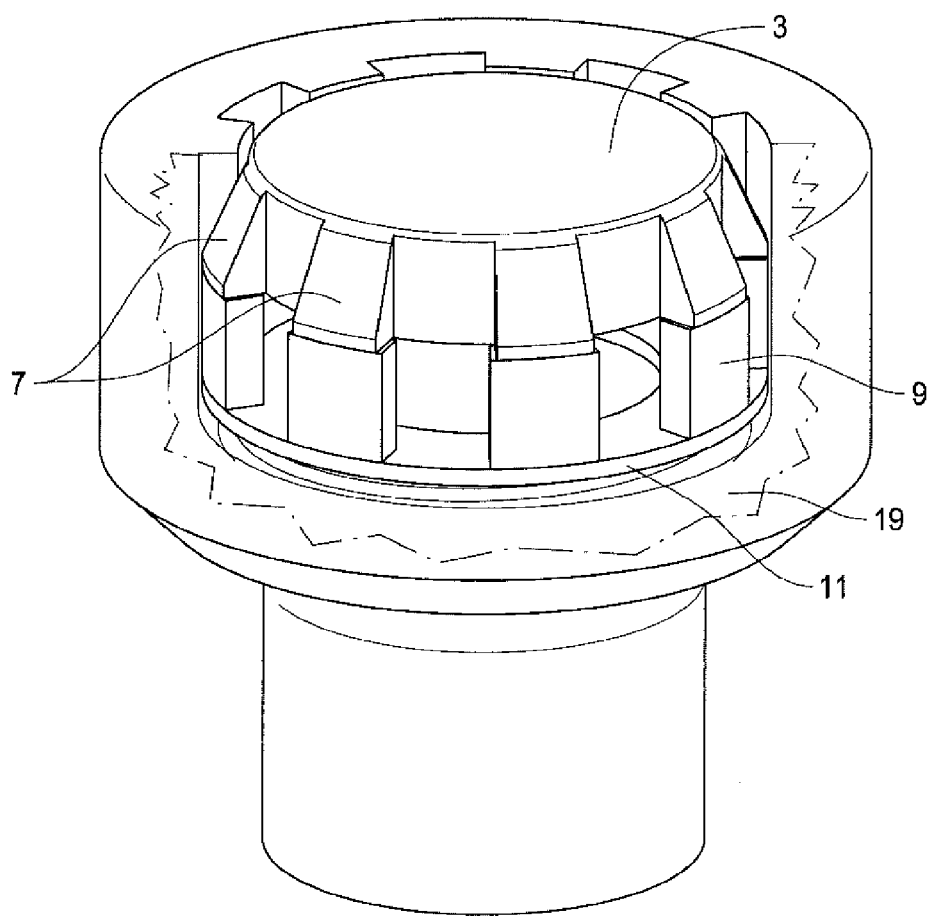
Figure 5C:
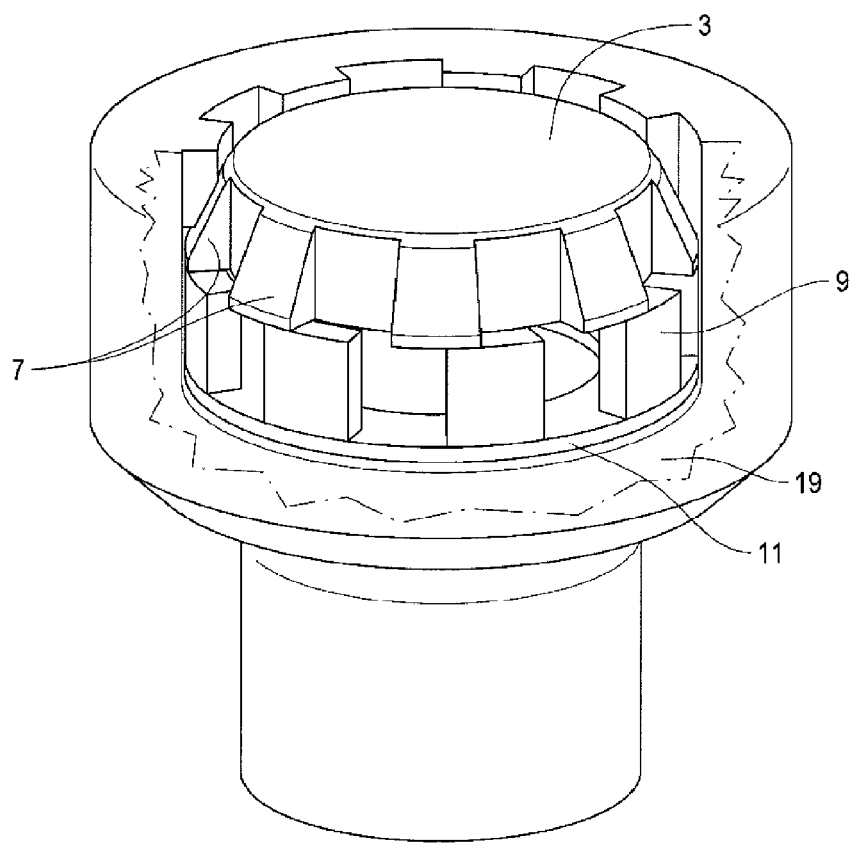
Figure 5D:
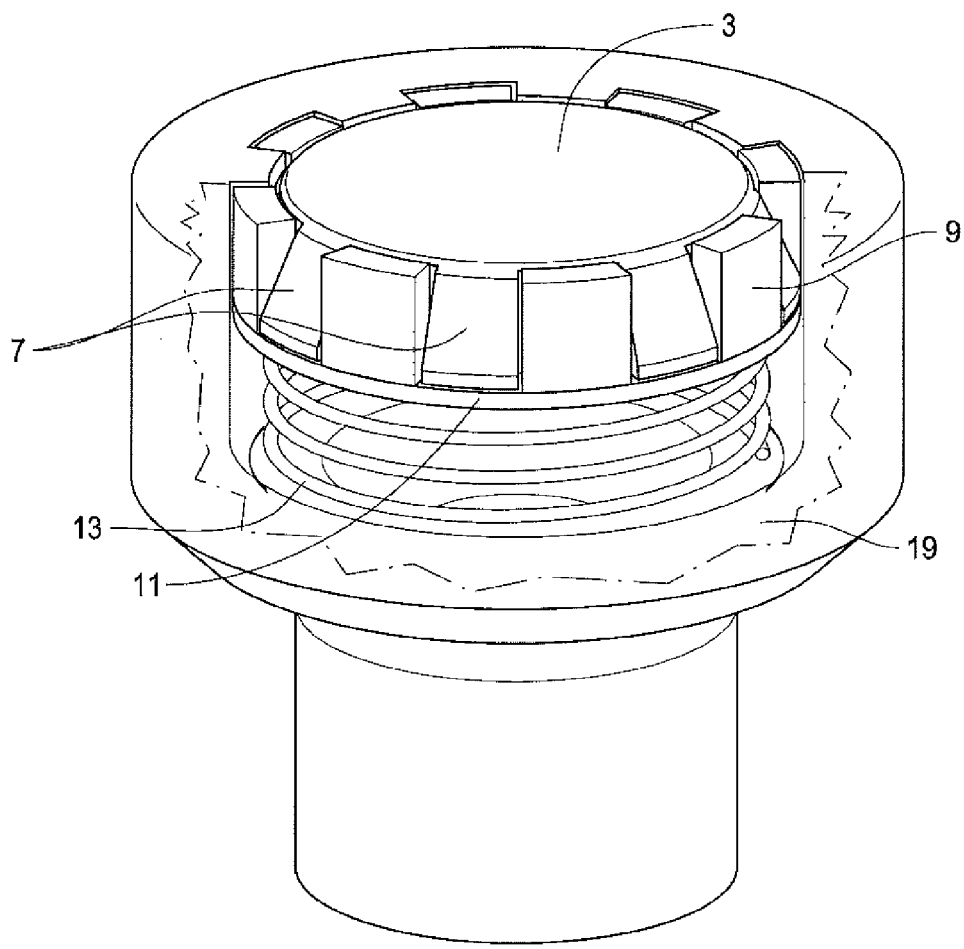

FIG. 5(a) shows the male part 3 and the female part 19 prior to insertion. On insertion of the male part 3 into the female part 19, the castellations of the male and female part intercalate as shown in FIG. 5(b), with the projections 7 of the male part castellation pushing against the locking blocks 9 to urge the blocks further down into the female part against the force of the spring. When the male part is fully inserted as shown in FIG. 5(b), the respective abutment surfaces allow the male part to be rotated relative to the female part, as shown in FIG. 5(c). The rotation of the male part 3 relative to the female part 19 causes the abutment surfaces to move into facing alignment, and the indentations in the respective castellations to also move into facing alignment. The aligned abutment surfaces prevent the parts from pulling apart. The spaces formed by the aligned indentations are large enough to receive the locking blocks, which under the bias of the spring therefore move upwardly into the aligned indentations, as shown in FIGS. 1 and 5(d). Once inserted, the locking blocks prevent further rotation of the male and female parts with respect to one another.

A cover plate 15 is screwed onto the joint to make a smooth air washed surface. The cover plate has screws 17 which screw into the locking blocks and thereby prevent the locking blocks from moving out of the indentations. However, if the screws are not used, centrifugal loading on the locking blocks nonetheless ensures that the joint does not become undone during running.

Figure 2:
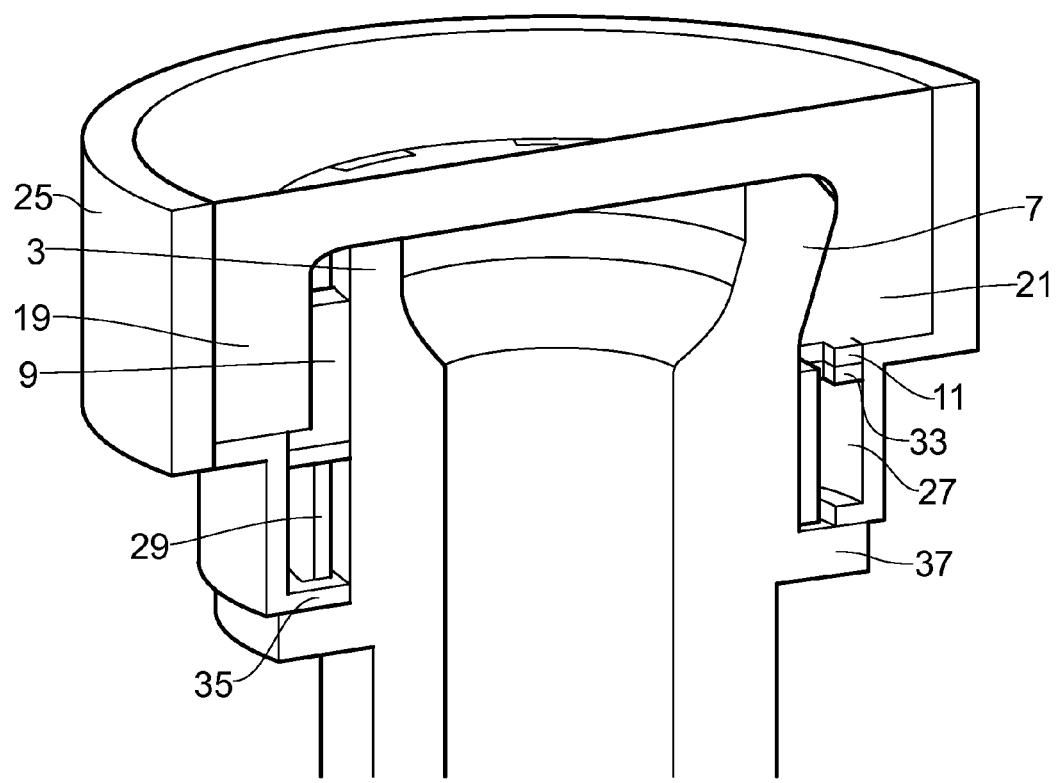
FIG. 2 shows schematically a cross section through a mechanical joint according to a second embodiment of the invention.

FIG. 2 shows a cross section through a mechanical joint according to a second embodiment of the invention for joining a propeller blade to an engine. Features which are common to the second embodiment and the first embodiment have the same reference numbers in FIGS. 1 and 2. The female part would in this case be at the end of the propeller blade (not shown) and the male part extend from the engine. The male and female parts have castellations with respective projections 7, 21. The radially outward surfaces of the male castellation projections 7 form abutment surfaces for abutting with the radially inner surfaces of the female castellation projections 21. The abutment surfaces of the male and female parts are matchingly tapered such that, when the projections are moved into facing alignment, the male and female parts interlock and are prevented from moving axially apart.

The male and female parts 3, 19 are encircled by a barrel 25 that is threaded on its inner wall 27. Locking blocks 9 are supported on a locking ring 11 inside the barrel. Ribs 29 protrude from the outside surface of the male part, and the ring 11 has corresponding grooves that prevent the ring from rotating with respect to the male part. The ring sits on a washer 33 whose outer facing surface has a thread that mates with a thread on the inside wall of the barrel 25. The washer also has grooves that engage with the ribs and prevent the ring from rotating with respect to the male part.

The barrel has a grooved flange 35 at its lower end that butts against a flange 37 on the male part. The grooves permit the barrel to be assembled over the castellation and ribs 29 on the male part before the male part is inserted into the female part. The flange 37 is spaced from the ends of the ribs 29 to form a track within which the flange 35 of the barrel can rotate.

To form the joint, the male part 3 and the female part 19 are pushed together, the respective castellations intercalating so that the projections on one castellation align with the indentations on the other castellation. When the male part is fully inserted, the male part is rotated relative to the female part, causing the abutment surfaces to move into facing alignment, and the indentations in the respective castellations also to move into facing alignment. The locking blocks 9 can then be inserted into the spaces formed by the aligned indentations. Rotating the barrel 25 causes the thread on the inner wall of the barrel to engage with the thread on the washer 33, and move the locking ring 11 axially inside the barrel, thereby inserting the locking blocks.

Optionally, the washer 33 can be omitted and a thread formed directly on the locking ring 11 for mating with the thread of the barrel 25. This arrangement would help to ensure that the locking ring 11 and blocks 9 could be withdrawn from the castellations even if e.g. the ring and blocks were not free running due to accumulated dirt.

FIG. 3 (a) shows schematically the female part 19 in a third embodiment of the invention, again for attaching a propeller blade 5 to an engine. Features which are common to the third embodiment and the first and second embodiments have the same reference numbers. In the third embodiment, the propeller blade carries the male part 3. Like the first and second embodiments, the male and female parts have respective castellations and tapered abutment surfaces. The parts are connected by intercalating the castellations, and then rotating the parts so that the abutment surfaces move into facing alignment and the indentations of the castellations also move into facing alignment.

However, in contrast to the first and second embodiments, locking blocks 9 are inserted into the aligned indentations radially with respect to the joint. A unison ring 39 (drawn as a transparent object) having angled slots 41 and pips 43 rests on the castellations of the female part. The angled slots engage with pins 45 that protrude from the locking blocks. As the unison ring rotates, the rotational movement is converted into radial movement of the locking blocks by the camming action of the edges of the slots on the pins.

FIG. 3(b) shows schematically the joint of the third embodiment. In this figure, the female part 19 is drawn as a transparent object. A circular plate 47 locates and covers the unison ring 39 that rests on the female part. A set of countersunk screws 46 attaches the circular plate to the female part. The circular plate has slots 49 through which project the pips 43 on the unison ring. The circular plate is in turn covered by a two part cover plate 15 (drawn as a transparent object) which has blind holes drilled in its underside. When the cover plate is installed, the pips in the unison ring locate in the blind holes in the cover plate and prevent the unison ring from rotating. Each of the two parts of the cover plate is on a respective side of the propeller and forms an air-washed surface. A further set of countersunk screws 48 attaches the cover plate to the female part.

A flange 53 projecting from the male part 3, covers the castellations, and traps the locking blocks 9 in position to prevent them from being lost under centrifugal loading. The outer diameter of the flange is less than the inner diameter of the circular plate 47 and is underflush relative to the top surface of the circular plate. The cover plate therefore seats on the circular plate rather than the flange.

FIG. 4 shows schematically a mechanical joint according to a fourth embodiment of the invention. Again, features which are common to the fourth embodiment and the first, second and third embodiments have the same reference numbers. For clarity, the female part 19 and the locking blocks 9 are drawn as transparent objects in FIG. 4. In the fourth embodiment, the propeller blade 5 carries the male part 3. Like the previous embodiments, the male and female parts have respective castellations and tapered abutment surfaces. The parts are connected by intercalating the castellations, and then rotating the parts so that the abutment surfaces move into facing alignment and the indentations of the castellations also move into facing alignment.

In the fourth embodiment, the locking blocks 9 are inserted into the aligned indentations radially with respect to the joint. Each locking block has a radially projecting screw 51 for screwing the locking block into the aligned indentations of the castellations. The complimentary thread for the screw is in the female part. The screw has a shoulder which pushes against the locking block, and an extension of the screw passes through a hole in the locking block and acts as a rivet, holding the screw in place in the locking block. The screw is, however, free to turn in the locking block. Unscrewing the screws retracts the locking blocks.

The castellations on the male part 3 are covered by a flange 53. The flange abuts the locking blocks when the locking blocks are inserted into the aligned indentations and helps to ensure the locking blocks do not move in the axial direction when the joint is centrifugally loaded.

The radially inner surface of each locking block 9 has a rubber shim 55 attached to it, and is angled in the opposite way to the tapers on the projections of the male part castellation. The corresponding radially inner surfaces of the indentations of the male part 3 form a mating surface with a similar taper. Thus, by screwing the locking blocks into position, the blocks urge the male part upwardly to chock the male part abutment surfaces against the female part abutment surfaces, and thereby remove play from the joint.

In this embodiment, the cowl or nacelle of the engine is removed to install or remove a blade, in order to access the radial screws. A two part cover plate 15 (one part on each side of the propeller, although only one of the parts is shown in FIG. 4) forms an air-washed surface and extends down the sides of the female part 19, covering the heads of the radially projecting screws 51. Once installed, the cover plate prevents the radial screws from coming loose. The female part may have a circumferential groove for mating with a lip on the inside facing surface of the cover plate, the cover plate parts then being installed radially with respect to the longitudinal axis of the joint. When the cowl or nacelle is in position, the cover plate cannot move radially outwards, and hence cannot be lost from the engine. Further, access to the radially projecting screws is only possible when the cowl or nacelle is removed.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A mechanical joint for joining two components, the mechanical joint comprising:
 a male part on one component and a corresponding female part on the other component, the male and female parts including:
  respective castellations that intercalate on insertion of the male part into the female part along a direction of insertion, the respective castellations having indentations, and
  respective abutment surfaces formed on projections of the respective castellations, the respective castellations being capable of rotating relative to each other around the direction of insertion upon insertion of the male part into the female part, and in response to rotation of the respective castellations: (i) the respective abutment surfaces of the male and female parts are face aligned to prevent the parts from being pulled apart, and (ii) the indentations of the respective castellations are face aligned; and
 one or more locking members configured to removably insert into the aligned indentations to prevent further relative rotation of the male and female parts.

2. The mechanical joint according to claim 1, wherein the one or more locking members are insertable into the aligned indentations along a direction which is parallel to said direction of insertion.

3. The mechanical joint according to claim 1, wherein the one or more locking members are insertable into the indentations along a radial direction of the mechanical joint.

4. The mechanical joint according to claim 1, wherein the joint further has an encircling member which is rotatable about the joint and is coupled to the locking members such that rotation of the encircling member causes the locking members to be inserted into the aligned indentations.

5. The mechanical joint according to claim 4, wherein the encircling member forms an outer casing of the joint.

6. The mechanical joint according to claim 4, wherein the encircling member is a unison ring.

7. The mechanical joint according to claim 1, wherein the one or more locking members have a respective screw for urging the one or more locking members into the respective aligned indentations.

8. The mechanical joint according to claim 1, wherein the one or more locking members are biased to insert themselves into the indentations.

9. The mechanical joint according to claim 8, wherein the bias is provided by one or more spring members.

10. The mechanical joint according to claim 1, wherein the respective abutment surfaces are matching tapered surfaces.

11. The mechanical joint according to claim 1, wherein the respective castellations are configured such that the male part is inserted into the female part along the direction of insertion for only one rotational position of the male part relative to the female part.

12. The mechanical joint according to claim 1, wherein the joint includes a means for chocking the respective abutment surfaces together.

13. The mechanical joint according to claim 1, wherein one of the components is a rotor blade and the other component is part of a transmission providing power to turn the rotor blade.

14. An aero engine having a row of rotor blades, each blade being attached to the engine with a mechanical joint according to claim 1.

15. The mechanical joint according to claim 1, wherein the direction of insertion of the male part into the female part is linear and axial.

* * * * *